April 26, 1932. M. O. SCHUR 1,855,205
DIFFERENTIAL PRESSURE GAUGE FOR CORROSIVE FLUIDS
Filed Dec. 11, 1926 4 Sheets-Sheet 1

Fig. 1

Inventor:
Milton O. Schur.

April 26, 1932.  M. O. SCHUR  1,855,205
DIFFERENTIAL PRESSURE GAUGE FOR CORROSIVE FLUIDS
Filed Dec. 11, 1926  4 Sheets-Sheet 2

Inventor:
Milton O. Schur.
by Taylor Brown Dunkin ??? ???
attys.

April 26, 1932.  M. O. SCHUR  1,855,205
DIFFERENTIAL PRESSURE GAUGE FOR CORROSIVE FLUIDS
Filed Dec. 11, 1926   4 Sheets-Sheet 4

Inventor:
Milton O. Schur.
Attys.

Patented Apr. 26, 1932

1,855,205

UNITED STATES PATENT OFFICE

MILTON O. SCHUR, OF BERLIN, NEW HAMPSHIRE, ASSIGNOR TO BROWN COMPANY, OF BERLIN, NEW HAMPSHIRE, A CORPORATION OF MAINE

DIFFERENTIAL PRESSURE GAUGE FOR CORROSIVE FLUIDS

Application filed December 11, 1926. Serial No. 154,207.

This invention relates broadly to apparatus for measuring continuously small differences of pressure at spaced points in a fluid container. Such measurements may be utilized for a variety of purposes, among which are the measurement of the rate of flow of a fluid in a conduit, or the measurement of the specific gravity of a liquid in a tank or pipe. It is an object of my invention to provide apparatus suitable for use with fluids of a corrosive nature, such for example as chlorine gas. In a mill using or producing chlorine, it is highly desirable to keep constantly in touch with the rate of flow through the gas main, but ordinary meters and gauges have been impracticable on account of their rapid destruction through corrosion by the gas. An object of this invention is to provide apparatus which is sensitive in operation but is so constructed that none of the parts is exposed directly to the gas and that all the parts which are in the vicinity of the main and hence exposed to diffused gas which may leak from the system are of rugged construction and little affected by the gas.

In carrying out one form of my invention, I employ a principle known to the art, namely, the measurement of gas flow by balancing a U-tube containing liquid, the arms of the U-tube being respectively connected by ducts with two spaced points in a gas main at which points a difference of pressure is produced by a suitably positioned, reduced sharp-edged orifice, Venturi meter, Pitot tube, or other equivalent means. With some such apparatus, the difference of pressures can be measured by the force required to keep the U-tube balanced and can be converted into terms of gas flow. Such apparatus can be made very sensitive to slight pressure changes, but heretofore has been unsuitable for use with corrosive gases since it has been impracticable to make the various parts of such apparatus of non-corrodible materials. In mills using corrosive gas, it is exceedingly difficult and frequently impossible to protect the delicate and corrodible parts of measuring apparatus from diffused gas. By my invention, I make it possible to house all the delicate parts of the apparatus at a distance (e. g., in a separate building), without diminishing the sensitivity of the apparatus in following and indicating slight changes in the flow of gas. Furthermore, the arrangement of the buildings of a mill where gas, such as chlorine, is used may be such that the control laboratory is located at a considerable distance from the chlorine room. As it is essential for efficient operation in many cases to keep in constant touch with and control of the gas flow, the value of apparatus which continuously indicates the flow at a distance from the gas main and affords ready control of the flow is apparent.

Another object of my invention is to provide apparatus which is capable of indicating continuously the gas flow as well as automatically regulating the flow to maintain any desired rate for which it may be set.

Another object of my invention is to provide means for recording continuously the specific gravity of a liquid in a tank or pipe, automatic allowance being made for variations in the temperature of the liquid. This apparatus also is designed for use with corrosive materials without being subject to deterioration through corrosion. A particular instance of a process for which this apparatus is particularly suited is in the manufacture of chlorides of sulphur where it assists in the control of the reaction between the chlorine and sulphur dissolved in sulphur chloride.

In order to protect the balancing U-tube from the corrosive fluid to be measured, I introduce a flow of a non-corrosive fluid into the connecting pipes between the U-tube and the gas main or other fluid container to flow into the main or container and keep the connecting pipes swept clear of corrosive gases or fumes which might otherwise diffuse therethrough. The fluid used to sweep out the connecting pipes is preferably a gas of such a nature as to be admissible into the main or container in minute quantities without making an objectionable mixture with the fluid to be measured. In measuring the flow of chlorine gas in a large main, for example, the introduction of small quantities of air is ordinarily not objectionable. For convenience, the sweeping fluid used in my apparatus will hereinafter be referred to as "air" though I do not limit myself to that medium. I provide further protection for the U-tube by causing the air introduced in the connecting pipes to bubble through a liquid seal before entering the main or container. These liquid seals prevent the diffusion of corrosive gas or fumes back through the pipes when the air is shut off, a flow of air however being necessary during the operation of the mechanism in order to transmit changes of pressure through the seals to the connecting pipes.

Other advantageous features and combinations will be apparent to one skilled in the art from the disclosure of the invention as found in the following description, and on the drawings, of which—

Referring to Figures 1, 2, 3, 6 and 7, an embodiment of my invention is therein illustrated for measuring the rate of flow of a gas which may be corrosive through a gas main 20. At a suitable point within the main 20, a thin wall 21 is inserted having a central sharp edged aperture 22 through which the gas flows. As a result of the constriction in the main caused by the wall 21, the pressure of the flowing gas above the diaphragm is greater than that of the gas below the wall. By suitable calculations, this difference of pressure may be converted into terms of rate of flow through the orifice 22. The pressures of the gas on both sides of the wall 21 are transmitted by means to be described to the two vertical arms 23, 24 of a U-tube 25 which is partially filled with a suitable liquid and is balanced on a knife edge 26 which rests upon a suitable support 27. The U-tube 25 may be supplied with a petcock 28 through which liquid in the tube may be replenished or changed. An adjustable weight 29 is also provided to give initial balance to the tube before the mechanism is put into operation. The tube may be enclosed in a suitable casing 30 on the bottom of which is mounted a standard 31 carrying the support 27 and connected with a cross bar 32 which is secured to the sides of the casing. The knife edge 26 is mounted upon a horizontal beam 33 to the ends of which the vertical arms of the U-tube are secured.

Figure 1:
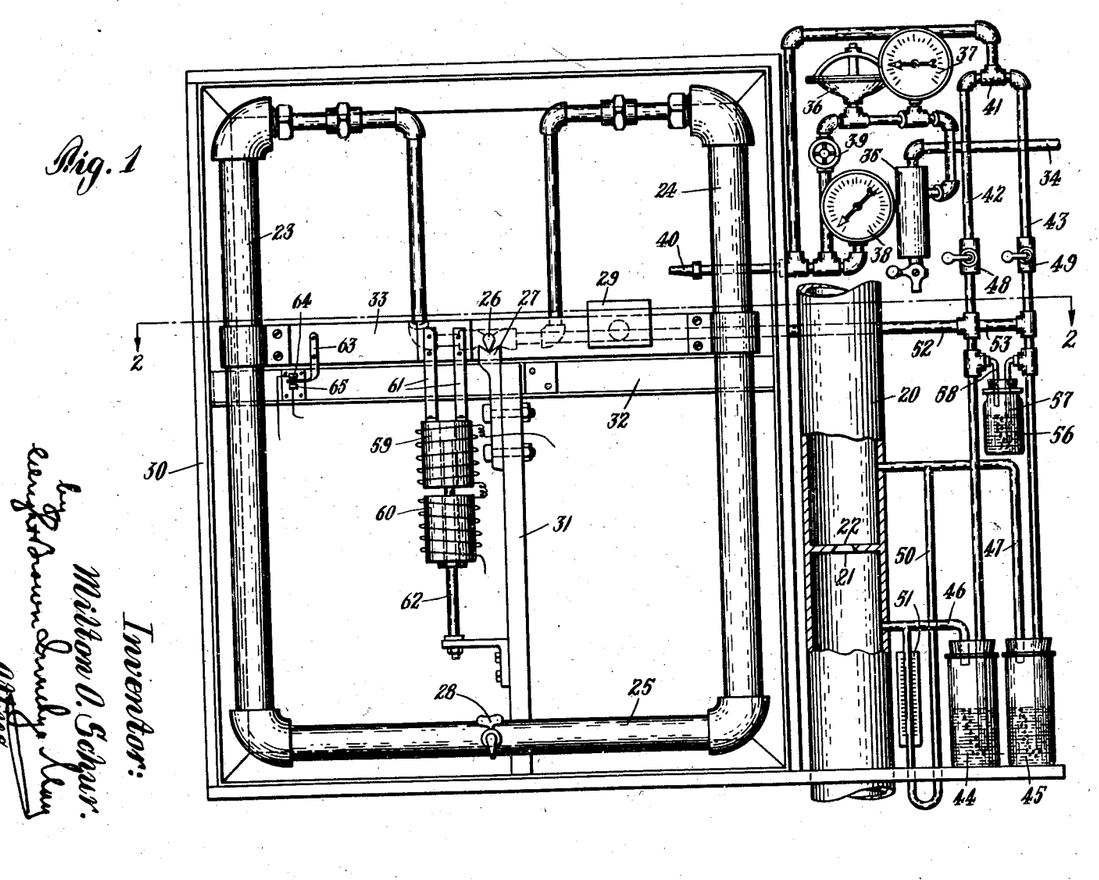
Figure 1 is an elevation of a portion of one form of my invention to be used in measuring gas flow.
Figure 2:
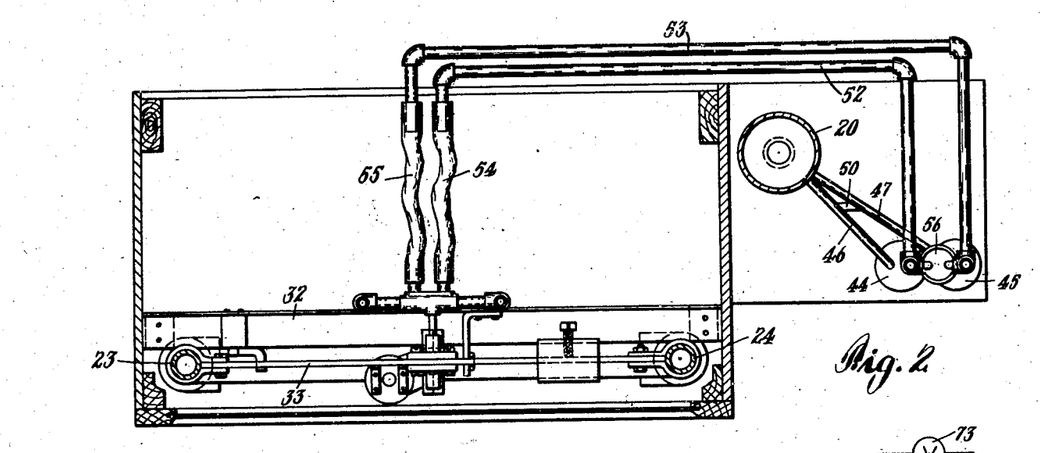
Figure 2 is taken on line 2—2 of Figure 1 and partly in section.

In order to prevent access of the gas in the main 20 to the U-tube, compressed air is supplied through a suitable pipe 34 and is introduced into the system between the U-tube and the main. After passing through a trap 35, it is passed through a suitable reducing valve 36, the pressure being thus reduced so as to be slightly greater than the maximum pressure to be encountered in the gas main 20. Suitable gauges 37, 38 may be supplied to guide the operator in the control of the pressures. A valve 39 may also be used in the low pressure line to regulate the flow of air. An air leak 40 may be provided on the low pressure line to extend into the casing 30 which contains the U-tube and associated mechanism for the purpose of sweeping out any corrosive gas which may tend to diffuse into this chamber. The low pressure air pipe is bifurcated as at 41, the two branches 42, 43 extending down respectively into bottles 44, 45, the extremities of these branches extending well below the surface of a suitable liquid such as a non-corrodible oil contained within these bottles which thus forms a trap or liquid seal in each bottle to prevent the passage of gases in a reverse direction into the pipes 42, 43 by diffusion or otherwise. From the spaces in these bottles above the surface of the oil, pipes 46, 47 lead to the gas main 20, the pipe 46 being connected with the main below the wall 21, the pipe 47 being connected at a point above the wall. The flow of air through the branches 42, 43 is regulated as by valves 48, 49 so that the air is made to bubble slowly through the oil in the bottles 44, 45. These bottles are preferably of glass or some other transparent material so that the rate of bubbling may be easily observed and regulated. A suitable manometer 50 may be connected with the pipes 46, 47, a scale 51 being used, if desired, to afford a direct reading of the pressure differences in the pipes 46, 47. It will be apparent that the gas pressures above and below the wall 21 in the main 20 will be communicated respectively through the pipes 47, 46 to the bottles 45, 44. As the air in the pipes 43, 42 bubbles slowly through the oil in the bottles, it will work against the pressures in the bottles, hence pressures in the bottles will be communicated respectively to the pipes 43, 42. Since the air from the pipes 42, 43 works not only against the pressures in the pipes 46, 47 but also against the "head" of oil in the bottles 44, 45, it is preferable to immerse the lower ends of the pipes 42, 43 to equal depths. The effects of unequal immersion, however, can be corrected by adjustment of the weight 29. It is preferred to connect pipes 52 and 53 as close to the bottles 44 and 45 as is practicable and to use pipes of generous size between these connections and the gas main 20 in order to reduce to a negligible value differences in the drop in pressure between the connections and the gas main. The pipes 42, 43 are connected to pipes 52, 53 leading to flexible connectors 54, 55 which connect them respectively with the two vertical arms of the U-tube 25. Thus the pressures on both sides of the wall 21 are separately communicated to the two vertical arms of the U-tube and a change in either pressure will tend to cause a rise of liquid in one arm of the tube and a corresponding fall in the other arm and will thus disturb the balance of the tube. The constant motion of the air through the oil traps in the bottles 44, 45 prevents any diffusion of the gas in the main 20 taking place through the pipes 42, 43. A safety bottle 56 partially filled with some suitable heavy liquid such as mercury may be provided between the pipes 42 and 43. Into this bottle a pipe 57 is led from the pipe 43 to a point well below the surface of the mercury. A pipe 58 leads from the pipe 42 to the space above the mercury in the bottle 56. In case of excessive rise in pressure in the tube 43, due for example to a sudden turning on of the gas in the main 20, such excessive pressure, which otherwise might tend to blow the liquid in the U-tube out through the pipes 54, 52, will relieve itself through the bottle 56.

The knife edge 26 is preferably placed only a short distance above the center of gravity of the U-tube in order to increase the sensitivity of balance of the tube. The flexible connecting pipes 54, 55 are connected with pipes which swing with the U-tube at a point as nearly as possible in line with the axis of the knife edge 26. This construction is designed to minimize any effect on the swing of the U-tube which might result from the connectors 54, 55. Any other suitable means of connecting the suspended pipes with the fixed pipes may be adopted.

Figure 3:
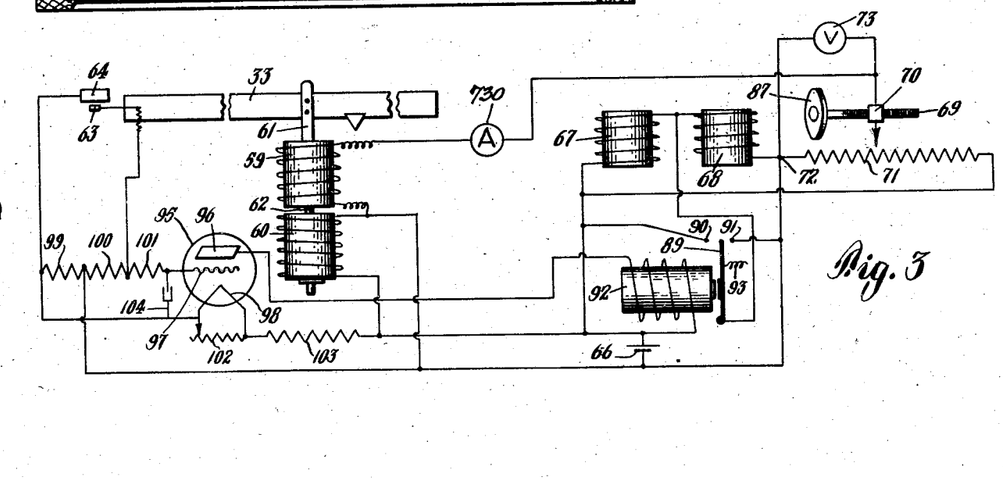
Figure 3 is a diagrammatic wiring plan of a system using the apparatus shown in Figure 1.
Figures 4, 5, 6, 7:
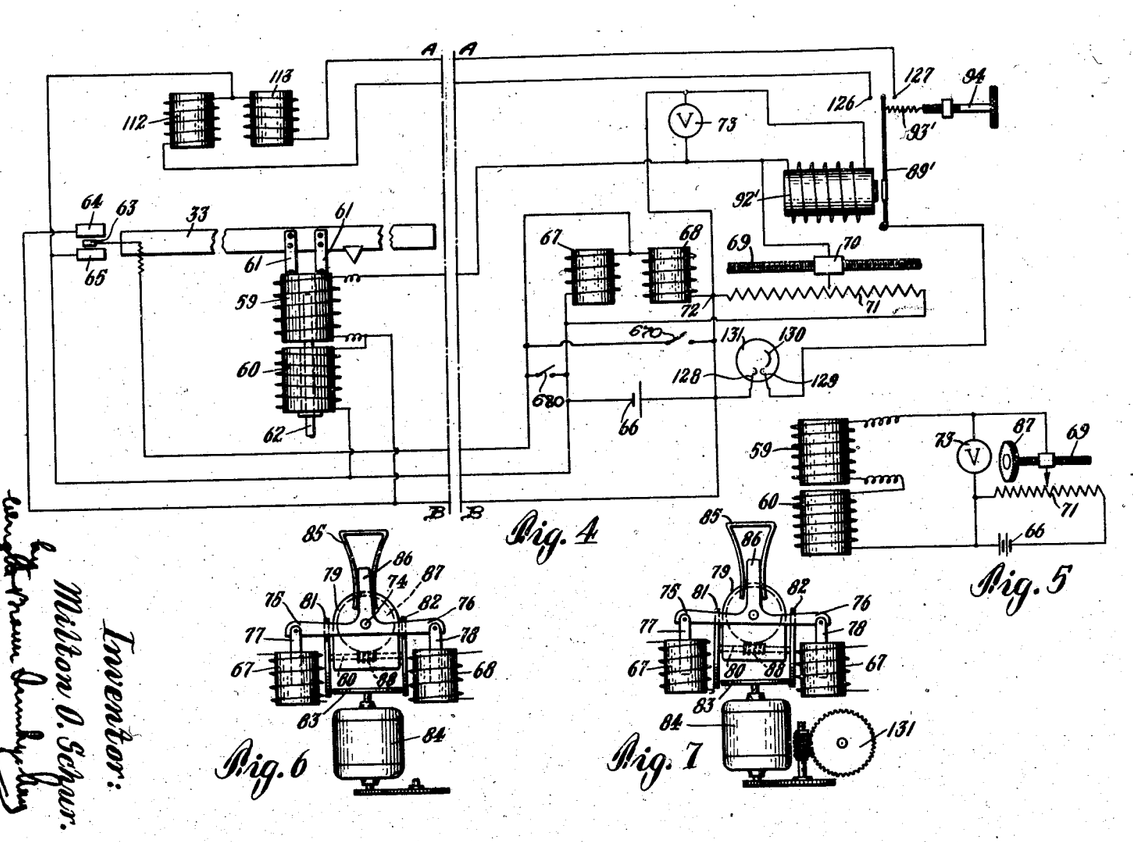
Figure 4 is a modified wiring plan showing in addition connections with a gas control mechanism.
Figure 5 is a modified form of a portion of the wiring systems shown in Figures 3 and 4.
Figure 6 is an elevation of mechanism, parts of which are indicated in the wiring plan shown in Figure 3.
Figure 7 is an elevation of mechanism, parts of which are indicated in Figure 4.

In order to measure the difference of pressure in the main above and below the wall 21, means is provided for restoring the U-tube to its balanced position after its balance has been disturbed by a change in the pressure difference in the pipes 47, 46 and hence in the vertical arms 23, 24 of the U-tube. The balance of the tube may be restored in several different ways. In Figure 1 are illustrated a pair of electromagnets 59, 60, the former being secured as by suitable straps 61 to the beam 33 which carries the U-tube 25. The lower magnet 60 is secured on a suitable core 62 which in turn may be mounted on the standard 31 or any other convenient portion of the U-tube housing. As shown, the core 62 extends upwardly into the core space of the magnet 59. By suitable electric connections to be described, currents are caused to pass through these electromagnets, the resulting electromagnetic pull being regulated to offset and to balance the torque due to the variation of levels of the liquid in the arms 23, 24 of the U-tube caused by the difference of pressure in the arms. To this end, apparatus as indicated in Figure 3 or Figure 4 may be provided. Upon the beam 33 is mounted a suitable contact member 63. This member is arranged to make electrical contact with suitable points 64 or 65 mounted on the cross bar 32 according as the member 63 rises or falls with the end of the beam 33 near which it is mounted. As a matter of structural detail, the wires leading from parts carried by the beam 33, such as the magnet 59 and the contact 63, are connected in such a way as to offer a minimum resistance to the motion of the beam on its knife edge. To this end, the connections with stationary portions of the wiring are preferably made close to the axis of the knife edge, and through light springs. Adverting to Figure 3, a wiring diagram is shown indicating apparatus suitable for maintaining the balance of the U-tube 25. For this apparatus, only one contact point 64 need be mounted on the cross bar 32 to cooperate with the contact member 63 which is mounted on the beam 33. In a mechanism of this kind, it is highly desirable that the apparatus be such that sparking between the points 63, 64 be eliminated as far as possible since in the ordinary operation of the machine there is a frequent making and breaking of contact between these points as the difference of pressure varies and is compensated for by the resulting action of the apparatus. It is also highly desirable that the apparatus be such as to operate satisfactorily and uniformly whether the contacts are kept clean or become more or less dirty so that the necessity for frequent inspection and cleaning may be avoided. A further desideratum is to prevent the transmission of chattering at the contacts to other portions of the mechanism. These features are realized to a very satisfactory extent in the apparatus shown in Figure 3. This comprises a suitable source of electric energy 66 which may be supplied from a battery or any other available source. To this source of energy which for brevity is hereinafter referred to as a battery, are connected in series a pair of electromagnets 67, 68 which control mechanism adapted to turn a threaded shaft 69 on which is mounted a contact-carrying nut 70 by which sliding contact is maintained with a suitable resistance 71. The fixed magnet 60, which is supported by the standard 31, is energized by direct connections with the source of energy 66. The movable magnet 59 is energized by the flow of current resulting from a potential difference between the movable point 70 on the resistance 71 and the point 72 at the end of this resistance member, the latter thus serving as a potentiometer. As will be seen from Figure 3, the ends of the resistance 71 are directly connected with the poles of the battery 66. It is apparent that motion of the contact nut 70 toward the right (Figure 3) will increase the potential drop between the contact 70 and the point 72, hence will increase the current flowing through the windings of the magnet 59. A suitable volt-meter 73 is connected across the points 70 and 72, this volt-meter providing an indication of the magnetic pull of the magnet 59, and hence of the torque exerted on the beam 33. If preferred, an ammeter 730 may be connected in series with the magnet 59 to indicate the torque exerted on the beam. The magnet 60 with its fixed core 62 is preferably so arranged that the current flowing therethrough will maintain the core magnetized to saturation, so that the pull exerted by the magnet 59 on the core 62 will be practically proportional throughout the entire range of operation of the instrument to the current flowing through the windings of the magnet 59 and hence to the voltage indicated on the volt-meter 73. The apparatus controlled by the magnets 67 and 68 is so connected to the contacts 63, 64 that a swing of the beam 33 in such a direction as to cause the contacts 63, 64 to touch will cause the movable contact 70 to travel to the right on the resistance 71, thus increasing the voltage on the circuit passing through the windings of the magnet 59 and in turn increasing the magnetic pull of the magnet 59 upon the core 62 until such pull is sufficient to separate the contacts 63, 64. The amount of pull required thus to separate the contacts is indicated on the volt-meter 73, this being an indication of the pressure difference in the arms 23, 24 of the U-tube and hence in the main 20 above and below the wall 21. The voltmeter may, if desired, be calibrated to read directly in terms of gas flow in the main 20, but since the rate of such flow varies as the square root of the pressure difference where a sharp edge orifice 22 is used, the voltage would vary with the square of the gas flow, hence the scale graduations on the voltmeter 73 would not be uniformly spaced. In order to permit uniform spacing of the scale divisions on the voltmeter 73, a slight modification of the wiring of the magnets 59, 60 may be made as indicated in Figure 5. In this form, the core 62 is not used and the current from the potentiometer 71 is made to pass serially through the two magnets 59, 60. Hence the voltage impressed on the circuit through the magnets 59, 60 is proportional to the square root of the torque on the beam 33 and hence directly proportional to the flow of gas in the main 20. The rotation of the screw shaft 69 may be effected by any suitable apparatus such as a reversible motor or mechanism as illustrated in Figure 6. As shown therein, a suitable lever is mounted horizontally as at 74, this lever having equal arms 75, 76 near the extremities of which are secured cores members 77, 78 which project respectively into the electromagnets 67, 68. Secured to the lever to rock therewith on the pivot 74 is a frame member 79 in which is journaled a shaft 80 carrying at its ends disks 81, 82. Between the lower portions of these disks is a third disk 83 which is constantly rotated as by a small electric motor 84. The disk 83 is preferably located in a plane at right angles to the planes of the disks 81, 82 and the lower portions of the disks 81 and 82 are positioned close to the edge of the disk 83. A suitable leaf spring 85 is provided to press against the sides of an upright arm 86 formed on the lever 75, 76 in such a way that the disks 81, 82 are normally kept out of contact with the constantly rotating disk 83. When, however, the magnets 67, 68 are unequally energized so that the pulls on the cores 77, 78 are unbalanced, one of the disks 81, 82 is brought in contact with the rim of the rotating disk 83 and is frictionally driven thereby, thus rotating the shaft 80. The rotation of the shaft 80 drives a gear 87 through a suitable worm 88 which meshes with the gear and is mounted on the shaft 80. The gear 87 is fixed to the screw shaft 69; thus the shaft 69 may be rotated readily in either direction through suitable relative energization of the magnets 67, 68. As shown in Figure 3, the magnets 67, 68 are connected in series with the battery 66 and as they are preferably identical in form, their pulls on the cores 77, 78 will normally be balanced. If, however, either one is short circuited, its flux will be greatly reduced, so that the other will pull its core inwardly and press the adjacent disk against the rim of the rotating disk 83. It will be observed that this method of connecting the magnets 67, 68 will minimize to a large extent the sparking effects at the contacts controlling their action, since at the "make" one of the magnets is short circuited, while at the "break" the inductive inertia of one coil is practically balanced by the inductive effect of the other, so that sparking at the contact terminals is greatly reduced. In order to provide a substantially sparkless contact between the points 63, 64, I may use a relay such as is shown in Figure 3. This comprises a make and break arm 89 which contacts with points 90 and 91 according to the difference of pull of a magnetic relay 92 and an adjustable spring 93. If the magnet 92 is sufficiently energized to overcome the pull of the spring 93, the contact 89 will meet the contact 90 and will thus short circuit the magnet 67, thus allowing the magnet 68 to move the core 78 and thus connect the rotating disk 83 with the screw shaft 69. If the current in the relay 92 falls below the strength sufficient to overcome the pull of the spring 93, the latter will draw the contact member 89 over to the point 91 and thus short circuit the magnet 68 and cause the screw shaft 69 to rotate in the opposite direction. The pull of the spring 93 may be adjusted by any suitable means such as a thumb screw.

For the control of the relay 92, I may employ apparatus as shown in Figure 3 comprising a triode tube 95 containing a plate 96, a grid 97 and a filament 98. The grid 97 may be connected as shown through suitable resistances 99, 100, 101 to the negative pole of the battery 66 and the contact members 63, 64. A suitable voltage for the filament 98 may be supplied through a potentiometer device 102 which is connected through a suitable resistance 103 to the positive pole and through the resistance 99 to the negative pole of the battery 66. The plate 96 is connected through the windings of the relay magnet 92 to the positive pole of the battery 66. Shunted around the resistances 99, 100, 101, I preferably employ a suitable condenser 104 for a purpose to be described. The triode 95 may be for example a radiotron U V—201A the characteristics of which are such that if the resistances 99, 100, 101 be properly chosen and arranged as shown in Figure 3, when the contact 63, 64 is closed, the potential on the grid will be practically zero. By using a 110-volt source of energy, and a relay 92 of 20,000 ohms resistance, a filament-plate current of the order of three milliamperes may be obtained. This current is sufficient to cause the magnet 92 to exert a suitable pull on the contact arm 89. When the contact 63, 64 is open, a negative charge of twelve volts on the grid 97 will be sufficient to reduce the filament-plate current to a value practically equal to zero. In either case, the grid-filament current does not exceed .03 microamperes. In order to attain these results, the resistance 99 should be of the order of 50 ohms, the resistance 100 should be several megohms, while the resistance 101 should be of the order of 10,000 ohms. The purpose of the condenser 104 is to add electrostatic capacity to the grid element 97, the result being to increase the interval required to build up the necessary negative voltage on the grid to cut down the filament-plate current. By employing a condenser 104 of sufficient capacity, the charging interval of the grid 97 may be increased sufficiently to avoid the transmission of chattering between the points 63, 64 to the relay 92. Furthermore, it will be obvious that by reason of the high resistances in the circuit containing the contacts 63, 64, a very light contact between the members 63 and 64 will be sufficient to operate the apparatus since the resistance in the circuit due to imperfect contact of the points is overshadowed and made comparatively negligible by the magnitude of the other resistances in the circuit, and the failure to keep the contact points clean will not diminish the effectiveness of the apparatus. It will also be obvious that since the grid-filament current, which is the current passing through the contact 63, 64 when closed, never exceeds .03 microamperes, the possible sparking at the contact will be extremely slight and practically negligible. Thus all the desirable features mentioned previously are attainable by the apparatus shown in Figure 3.

Figures 8, 9, 10, 11, 12, 13, 14:
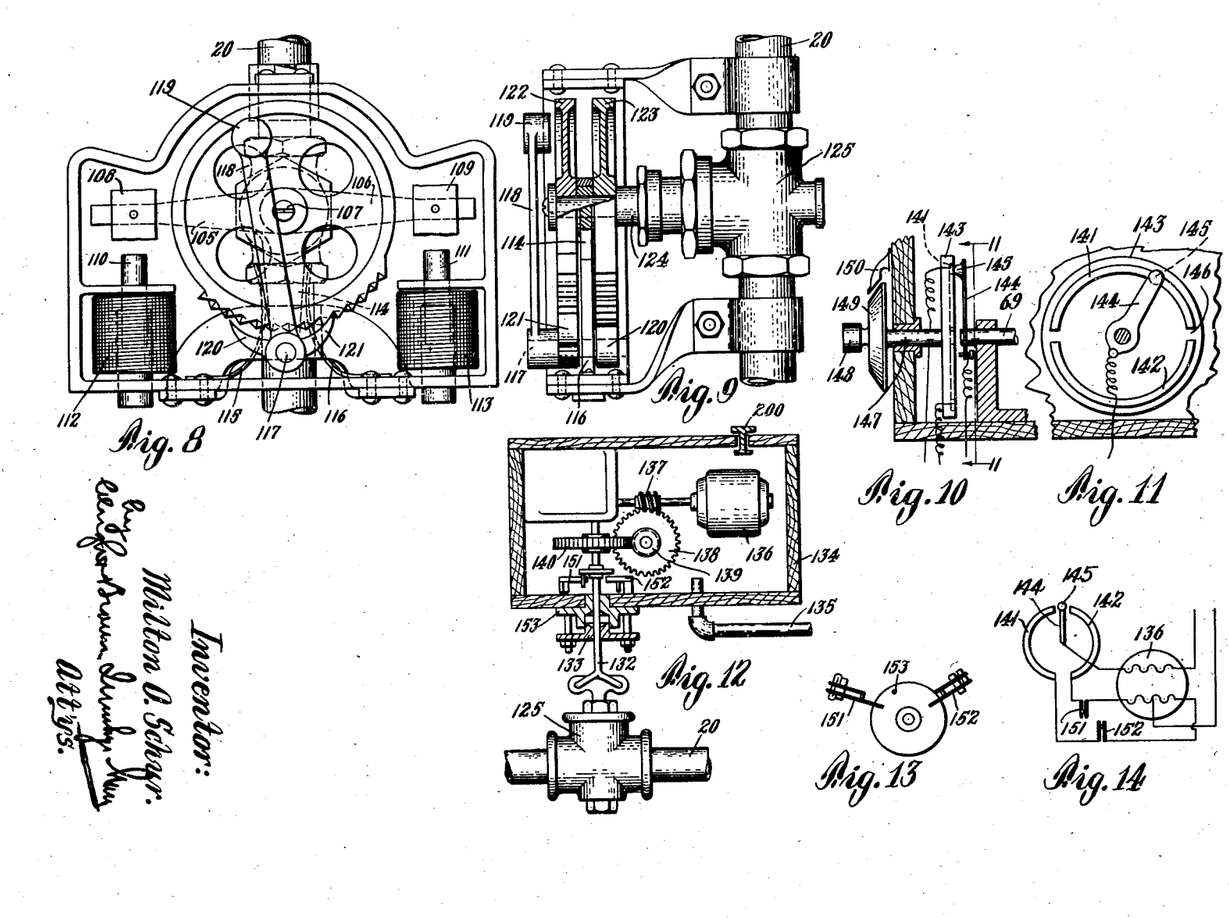
Figure 8 is a front elevation of a valve regulator.
Figure 9 is a side elevation of the same partly in section.
Figure 10 is a side elevation of a portion of another kind of mechanism for controlling a valve.
Figure 11 is a section on the line 11—11 of Figure 10.
Figure 12 is an elevation of valve-actuating mechanism controlled by the apparatus shown in Figure 10.
Figure 13 is a detail of limit stop switches shown in Figure 12.
Figure 14 is a wiring plan of the apparatus shown in Figures 10–13.

Thus far I have described apparatus for keeping the beam 33 on which the U-tube is mounted in a balanced position and for indicating the amount of torque required to maintain such balance, such torque being a measure of the flow of gas in the main 20. In practical mill operation, it is frequently desirable to maintain the rate of flow of gas at a definite predetermined value. For this purpose, a suitable gate valve may be supplied for the main 20 and means may be provided for regulating the valve from time to time to maintain a substantially constant flow of gas through the main. As a matter of mill practice, it is generally preferable to have such regulation made by an operator in response to indications of changes of flow as indicated on the dial of the instrument 73. If the instrument 73 is located at a distance from the gas main, as for example in another remote building, it is desirable to have means whereby he will be enabled to operate the valve in the main 20 from a distance. This may be accomplished by means of apparatus to be described which is illustrated in Figures 8 and 9. This valve-operating apparatus is electromagnetically actuated and can be controlled by an operator at any desired distance, suitable push buttons being provided for the operator's use by which he will be enabled to open or to close the valve by any desired amount. In case automatic mechanism is desired for the control of the gas flow, the apparatus shown in Figures 8 and 9 may be controlled by automatic mechanism as indicated in Figure 4; or a modified form of automatic controlling apparatus such as is illustrated in Figures 10 to 14 may be used.

Referring to the form of mechanism shown in Figures 8 and 9, 105, 106 indicate arms of a lever which is mounted at its center as at 107. Near the ends of arms 105, 106 are leather buffers 108, 109 which are adapted to be struck respectively by plungers 110, 111 actuable by electromagnets 112, 113. The lever 105, 106 is formed with a downwardly extending arm 114 which is normally maintained in a vertical position by leaf springs 115, 116 which press against the sides thereof. At the lower extremity of the arm 114 is journaled a short shaft 117 which carries an upwardly extending rod 118 provided with a suitable weight 119 at the upper end thereof. Also fixed on the shaft 117 are a pair of oppositely extending pawls 120, 121 which are respectively arranged to engage teeth formed on the peripheries of a pair of wheels or disks 122, 123 mounted on the stem 124 of a valve 125 in the main 20. It will be noted from an inspection of Figure 8 that the rod 118 is capable of a limited swing about the axis of the shaft 117, the limit at each end of its swing being defined respectively by the engagement of the pawls 120 and 121 with the disks 122 and 123. The angular arrangement of the pawls 120 and 121 with respect to each other is such that only one of these pawls at a time can be in contact with its corresponding wheel. In Figure 8 the pawl 121 is shown in contact with the wheel 122, the pawl 120 being spaced from its wheel. If now the magnet 113 is energized causing the plunger 111 to fly up and strike the buffer 109 at the end of arm 106, the rocking of the lever will swing the vertical arm 114 to the right, carrying with it the shaft 117. Since the pawl 121 is in engagement with the teeth of the wheel 122, this rocking of the lever will result in a rotation of the wheel 122 through a small angle, hence in a corresponding rotation of the valve stem 124. If on the other hand, the magnet 112 is energized causing the plunger 110 to strike the buffer 108 on the lever arm 105, the vertical arm 114 will be swung to the left with the shaft 117 carried thereby. Since the pawl 120 is at this time not in engagement with the teeth on the wheel 123, this motion will not cause any rotation of the valve stem 124, but on account of the inertia of the weight 119 at the upper end of the rod 118, the latter will be caused to rock to the right on the axis of the shaft 117, thus removing the pawl 121 from engagement with the teeth of the wheel 122 and putting the pawl 120 in engagement with the teeth of the wheel 123. If the magnet 112 is now energized again, the pawl 120 being in engagement with a tooth of the wheel 123 will rotate that wheel and the valve stem 124 through a small angle, and each successive energization of the magnet 112 will cause further rotation until an energization of the magnet 113 rocks the rod 118 back to the position shown in Figure 8. Thus a slow opening or closing of the valve 125 in the gas main 20 may be effected, an extra lag in the operation being introduced by the necessity of shifting the position of the rod 118 before the pawls become effective to reverse the direction of rotation of the valve stem 124. As previously stated, the magnets 112, 113 may be simply connected to a battery and a pair of push buttons 670 and 680 located in any convenient place for manual regulation of the valve 125. If fully automatic control of the valve be desired, the magnets 112, 113 may be connected to the flow-indicating apparatus, as shown in Figure 4. In this figure, the principle of operation of the flow-indicating mechanism is substantially the same as that shown in Figure 3 and hereinbefore described in detail, but the portion of the relay circuit involving the triode tube has been omitted in this figure for the sake of simplicity. Instead, the wires from the coils 67, 68 are shown as running directly to the contact points 63, 64 and 65, but it is obvious that the triode device illustrated in Figure 3 can readily be incorporated in the wiring plan shown in Figure 4. Referring to Figure 4, the relay magnet 92' is connected in parallel with the voltmeter 73 and if sufficiently energized, draws the armature arm 89' toward it in opposition to the pull of an adjustable spring 93', thus causing the arm 89' to connect with a contact point 126. This closes a break in the circuit connecting the magnet 112 with the battery 66. If the pull of the spring 93' is greater than the attractive effect of the magnet 92' on the arm 89', the latter is moved to make contact with a point 127, thus closing a break in the circuit through the magnet 113 of the gas valve operating mechanism. In order to cause slow successive energizations of the magnet 112 or 113, a further break in their circuits is provided at points 128, 129. The gap between these points is adapted to be bridged by a metal piece 130 set in a slowly rotating disk 131. Thus when the arm 89' is in contact with the point 126 or 127, the corresponding magnet 112 or 113 will not be energized unless the gap between the points 128, 129 is closed by the connector 130. So long, however, as the arm 89' is in contact with either of the points 126, 127, the corresponding magnet will be energized each time the connector 130 reaches the gap 128, 129 in the rotation of the disk 131. As shown in Figure 7, the disk 131 may be constantly rotated by suitable gearing connecting it with the motor 84. Since the current flowing through the windings of the magnet 92' varies with the rate of gas flow, it is apparent that by adjusting the tension of the spring 93' the magnets 112, 113 may be made to operate to maintain any desired rate of flow.

It will be observed that the wiring as shown in Figure 4 consists of a number of separate circuits leading from the poles of the battery 66. Of these circuits, the one leading through the points 128, 129, the arm 89', and the magnet 112 or 113, has been described. A second circuit leads through the fixed magnet 60 alone, this circuit serving to maintain the magnet 60 constantly energized and the fixed core 62 therein constantly saturated. A third circuit leads through the magnets 67, 68 in series. The energization of these magnets therefore is normally equal and their pulls on the cores 77, 78 (Figure 7) are therefore normally balanced. In order to short circuit one or the other of these magnets, a connecting wire is led from between them to the contact 63 on the arm 33. The contacts 64 and 65 which are fixed to the housing or frame thereof are respectively connected to the two poles of the battery 66. Hence when the contact 63 touches the contact 64, the magnet 68 is short circuited and the magnet 67 is thus allowed to move its core 77 and thus to press the disk 81 against the constantly rotating disk 83, this resulting in a rotation of the screw shaft 69 and a longitudinal motion of the contact 70 on the potentiometer resistance 71. When the contact 63 touches the contact 65, the magnet 67 is short circuited, thus permitting the magnet 68 to press the disk 82 against the rim of the disk 83 and thus to cause the contact 70 to move in the opposite direction on the resistance 71. The fourth circuit from the battery 66 passes through the resistance 71 from which is taken between the point 72 and the sliding contact 70 a potential difference which energizes a circuit containing in parallel the voltmeter, the magnet 92', and the magnet 59, the latter being mounted on the beam 33. Thus it will be seen that a movement of the contact 70 upon the potentiometer resistance 71 will vary the voltage through the magnets 92' and 59 and the voltmeter 73. The change of voltage in the magnet 59 will cause a corresponding change in its pull on the core 62, which pull will increase or decrease, as the case may be, until the balance of the beam 33 has been restored. The change in voltage affecting the magnet 59 also equally affects the magnet 92' and if the resulting change in current therethrough is sufficient, the arm 89' may be shifted in its position so as to change the direction of actuation of the valve stem of the valve 125 in the gas main 20. As in the wiring system shown in Figure 3, so also in that in Figure 4, the magnets 59 and 60 may be connected as shown in Figure 5 in order that the voltmeter 73 may be calibrated in uniform scale divisions to indicate directly the rate of gas flow. It is obvious that the various circuits connected to the battery 66 may be independently connected to separate sources of energy if desired.

In order to illustrate clearly the segregation of all portions of the apparatus which are subject to deterioration from corrosion, a break A B has been indicated in the wires in Figure 4. The apparatus to the left of the break A B is that which is necessarily installed in proximity to the gas main 20, that to the right being installed, if desired, in a distant building. The materials used in the construction of the apparatus to the left of the break may be so chosen as to render this portion of the mechanism practically impervious to corrosion by diffused gases, and the parts themselves may be made heavy and rugged without diminishing the sensitivity of the apparatus. This is an important practical consideration in mill practice, for although it is theroretically possible to enclose apparatus in a case and to sweep out gases by an air leak into the casing, the corrosive gases permeate everything and quickly ruin any corrodible parts. By way of example, the apparatus in the gas house may be constructed of materials as follows:—

The beam 33 may be supported by agate knife edges on agate bearings which are supported on a slab of slate. The beam itself may be of a phenolic condensation product or heavily enamelled iron and the magnets 59 and 60 may be thoroughly covered with sealing wax. The U-tube may be of glass. The contacts 63, 64, 65 are preferably of platinum. The parts of the valve-actuating mechanism illustrated in Figures 8 and 9 are all of heavy rugged construction and will operate without attention indefinitely. Here also the magnets 112 and 113 are preferably encased in sealing wax.

A modified form of apparatus for controlling the gas flow is illustrated in Figures 10 to 14. While this form of flow control device theoretically is as effective as the form illustrated in Figures 4, 8 and 9, it is from a practical point of view inferior on account of its less rugged construction and it is liable to deterioration through corrosion by diffusing gas. Referring to Figure 12, the valve 125 in the gas main 20 is provided with a stem 132 passing through a suitable gas tight stuffing box 133 into a closed chamber 134 which houses the mechanism for operating the valve. An air leak 135 may be introduced into the chamber to sweep out any traces of corrosive gas which might tend to diffuse thereto; in this case, means for allowing excess air to escape from within case 134 would be provided as designated at 200. The valve stem 132 is operatively connected to a motor 136 through suitable gearing such as a worm 137 and worm gear 138 and a second worm 139 mounted coaxially with the gear 138 and meshing with a second worm gear 140 which is mounted on the valve stem 132. The motor 136 is preferably of a reversible type and is connected as indicated in Figure 14 to a pair of arcuate metal strips 141 and 142 mounted on a disk 143 of fiber or equivalent insulating material as shown in Figure 11. A metal arm 144 is mounted on an extension of the screw shaft 69, the disk 143 being arranged coaxially of the shaft 69 but independently thereof. A contact point 145 adjacent to the extremity of the arm 144 is adapted to contact with either the metal piece 141 or the piece 142, or to rest against the disk 143 between the ends of these pieces as at 146. The disk 143 is fixed to the end of a short shaft 147 at the other end of which is a head 148 by which the disk may be rotated to any desired position. Also mounted on the shaft 147 is a dial 149 cooperating with a suitable index 150. The dial 149 is preferably marked with scale graduations corresponding to rates of gas flow. When the contact point 145 rests on the disk 143, at the point 146, it will be evident that no current will pass through the motor 136, and the valve 125 will remain undisturbed as long as the flow of gas remains constant and the dial 149 is not disturbed. If the gas flow through the main 20 changes, this change will cause a rotation of the screw shaft 69 by apparatus previously described to rebalance the beam 33. This rotation of the shaft 69 will thus move the arm 144 to contact with the metal piece 141 or 142. This closes a circuit through the motor 136 and causes it to rotate in a direction to open or close the valve 125 in order to restore the flow of gas through the main 20 to its desired rate. This change of rate of gas flow back to normal will cause the rotation of the screw shaft 69 in the opposite direction until the contact point 145 is again at the point 146 on the fiber disk, whereupon the motor 136 ceases operation. In order to provide against excessive rotation of the valve stem 132 due to failure of some portions of the apparatus to operate properly or for any other reason, I may provide limit switches 151, 152, which as shown in Figure 13 are arranged to be engaged by a pin 153 mounted on a disk carried by the valve stem 132 when the valve stem has reached predetermined limiting angular positions. Engagement of the pin 153 with the switch 151 or 152 will open the switch and thus shut off the motor 136 until conditions in the system change to start operation of the motor in the opposite direction.

Certain embodiments of my invention having thus been described it should be evident to those skilled in the art that various changes and modifications might be made therein without departing from its spirit or scope as defined by the appended claims.

I claim:—

1. In apparatus of the class described, a rockably mounted beam, pressure-responsive means for imparting rocking movement to said beam; means for automatically opposing said rocking movement and restoring the beam to normal position, comprising an electromagnetic device having a member attached to the beam and a fixed cooperating member; means for variably energizing said device including a source of electric energy, and a variable resistance in series with a member of said device; mechanism for varying said resistance to control the energization of the device, said mechanism comprising a rotatable member, a contact point movable by the rotation of said rotatable member, a motor, a clutch actuable to connect the motor with said rotatable member; and means controlled by movement of the beam to actuate the clutch.

2. In combination, a conduit having a constriction therein, a flow meter comprising a rockably mounted pressure-responsive device connected with said conduit at points of different fluid pressure in the vicinity of said constriction, means for rocking said device in response to pressure changes in said conduit, means for restoring said device to normal position when rocked, means for controlling said restoring means, a valve in said conduit, and means for regulating said valve to maintain the flow substantially at a predetermined rate, said regulating means being controlled by said controlling means.

3. The combination with a conduit having a constriction therein and a gate valve, of a flow meter comprising a rockably mounted beam, pressure-responsive means carried by said beam and connected with said conduit at two points of different pressure in the vicinity of the constriction for impressing rocking forces on said beam, means for opposing a magnetic pull to said forces upon movement of the beam and for restoring the beam to normal position, means for automatically controlling the strength of the magnetic pull to balance said forces, and means for automatically adjusting said valve to maintain the flow substantially at a predetermined value, said valve-adjusting means being controlled by said controlling means and including mechanism causing a lag in the operation of said valve whenever the direction of operation thereof is changed.

4. In combination with a conduit having a constriction therein and a gate valve, of a flow meter comprising a rockably mounted beam located near said conduit, pressure-responsive means carried by said beam for impressing rocking forces on said beam, comparatively short ducts connecting said pressure-responsive means with said conduit at two points of different pressures in the vicinity of said constriction, an electromagnetic device having a member attached to said beam and a fixed member cooperating therewith to exert a magnetic pull on said beam opposing said rocking forces, a valve-operating mechanism including an electromagnet, means remote from said conduit for energizing said electromagnetic device and said electromagnet; and common control means for regulating the energization of the electromagnetic device to balance the rocking forces, and the energization of said electromagnet to regulate the flow in the conduit to a predetermined value, said control means being also remote from said conduit.

5. Apparatus of the class described comprising a rockably mounted beam, pressure-responsive means carried by said beam for impressing rocking forces thereon; a device for opposing a magnetic pull to said rocking forces; means remote from said beam for energizing said device; and means for controlling said energizing means comprising make-and-break contacts operable by motion of the beam, and a relay interposed between and operatively associating said make-and-break contacts with said energizing means, said relay having delayed-action elements whereby the transmission of chattering from the contacts through the relay is prevented.

6. Apparatus of the class described, comprising a rockably mounted beam, pressure-responsive means carried by said beam for impressing rocking forces thereon; a device for opposing a magnetic pull to said rocking forces; means remote from said beam for energizing said device; and means for controlling said energizing means comprising a triode having a filament, grid and plate, a filament-grid circuit, a make-and-break contact associated with said beam and connected in said circuit, a filament-plate circuit, a relay coil connected in said filament-plate circuit; and means actuable by said relay for regulating the electric current supplied to said device.

In testimony whereof I have affixed my signature.

MILTON O. SCHUR.